United States Patent [19]

Levy

[11] 4,358,643

[45] Nov. 9, 1982

[54] TWO TO FOUR WIRE HYBRID CIRCUIT

[75] Inventor: Allan Levy, Delray Beach, Fla.

[73] Assignee: Siemens Corporation, Iselin, N.J.

[21] Appl. No.: 141,780

[22] Filed: Apr. 21, 1980

[51] Int. Cl.³ .............................................. H04B 1/58
[52] U.S. Cl. ........................................... 179/170 NC
[58] Field of Search .......... 179/170 R, 170 T, 170 NC

[56] References Cited

U.S. PATENT DOCUMENTS

| | | | |
|---|---|---|---|
| 3,973,089 | 8/1976 | Puckette | 179/170 NC |
| 4,163,878 | 8/1979 | Hashemi | 179/170 NC |
| 4,192,978 | 3/1980 | Vincent | 179/170 NC |
| 4,254,305 | 3/1981 | Treiber | 179/170 NC |

OTHER PUBLICATIONS

Appel and Abramson; "Electronic Hybrid for Telephone Using a Differential Amplifier"; IBM Tech. Disclosure Bulletin; vol. 16, No. 5; Oct. 1973; pp. 1513-1514.

Primary Examiner—John H. Wolff
Assistant Examiner—Randall P. Myers
Attorney, Agent, or Firm—Spellman, Joel and Pelton

[57] ABSTRACT

There is disclosed a two- to four-wire hybrid circuit of a telecommunication system. A line coupling circuit, preferably a transformer is connected to a terminal line. Between the coupling circuit and first and second amplifying means each assigned to a receiving branch and a transmitting branch of a transmission line, respectively there is arranged a balancing network composed of an attenuator, a first and a second hybrid impedance. The first impedance connected to the coupling circuit has a value matching the value of a coupled terminal line impedance which is effective at the four-wire side of the coupling circuit. The second impedance and the attenuator interconnect the outputs of the first amplifying means. The value of the series connection are chosen such that the resistance value of the attenuator is substantially higher than the value of the actual resistance component of the first impedance and the ratio of the coupled line impedance to the first line impedance equals the ratio of the attenuator resistance to the second impedance. The second input of the second amplifying means is connected to the coupling circuit.

6 Claims, 2 Drawing Figures

TWO TO FOUR WIRE HYBRID CIRCUIT

BACKGROUND OF THE INVENTION

The invention relates to a two to four-wire hybrid circuit for coupling a bidirectional terminal line to a transmission medium having separate branches for a receiving and a transmitting direction of analog electrical signals.

Hybrid circuit arrangements for telecommunication systems are very well known in the art. Such a circuit arrangement couples usually a subscriber set or more generally the two-wire terminal line to a four-wire transmission medium, usually a transmission line. A main element of a conventional hybrid circuit arrangement is a coupling circuit designed as transformer which has to transform output voice signals from the two-wire terminal line to the transmitting branch of the four-wire transmission line or to couple input voice signals from the receiving branch of the four-wire transmission line to the two-wire terminal line. The principle object of such a hybrid circuit arrangement is to provide adequate transmission characteristics in both signalling directions with minimal loss while having a high cross-talk attenuation from the receiving branch to the transmitting branch of the four-wire transmission line.

A main problem in designing an appropriate hybrid circuit is that a non-real line impedance is present on the two-wire side. Well-known hybrid circuits have a balancing network composed of a frequency-dependent attenuator to compensate this influence. This balancing network, which comprises among other things a relatively high additional inductance, is arranged on the four-wire side of the hybrid circuit. Analog signals coming in on the receiving branch of the transmission line are restored by a receiver amplifier, whereas the outgoing signals are fed to inputs of a transmitter amplifier. It depends upon the point of view whether these amplifying stages are considered to be parts of the hybrid circuit arrangement or the transmission medium. In any case, however, the interfacing characteristics of the amplifier stage, the output impedance, the input impedance, respectively, have to be taken into consideration for designing a proper hybrid circuit.

Since conventional hybrid circuits have constraints in view of electrical characteristics, such as cross-talk attenuation and the mechanical design, such as space requirements, efforts have been made also for designing so-called active hybrid circuits. A known active hybrid circuit is described in an article "Line Circuit Interfaces For Additional Switching Systems" by G. Dooley in the IEEE Transactions On Communications, Vol. Com-27, July 1979, pages 978 to 981. The disclosed hybrid circuit is composed of a thick-film microcircuit comprising a receiver amplifier and a transmitter amplifier connected to the receiving branch and to the transmitting branch, respectively. A balancing network is arranged between the output of the receiver amplifier and the input of the transmitter amplifier. Symmetrically to the two-wire terminal line there is arranged a pair of battery feed arrangements, each connecting a pole of the supply voltage to a respective wire of the terminal line. Each battery feed arrangement comprises a series connection of a switching transistor and a battery feed resistor. Each switching transistor is controlled by an output signal of a respective one of the second amplifiers. Inputs of these amplifiers, in turn, are connected to a respective one of two outputs of the receiver amplifier, which outputs, deliver output signals in phase opposition.

In order to transmit voice signals in opposite direction from the terminal line to the transmission line, there is arranged a third amplifier which is connected by inputs to the terminal line and by an output to the transmitter amplifier. The battery feed resistors and the balance network are still implemented using discrete components. The thick-film hybrid circuit allows precision laser trimming of those resistors which require absolute or ratio trimming which is still believed to be necessary for maintaining the required trans-hybrid loss and common mode rejection.

This example of an active hybrid circuit exposes clearly the difficulties involved with implementing such a hybrid circuit notwithstanding its simple structure. Difficulties will further increase if another objective is taken into consideration. Presently available telecommunication systems and even more advanced systems have to be easily adjustable to different applications in different countries for matching different national standards. This means specifically in view of a hybrid circuit that provisions have to be made allowing adjustments to different national standards with respect to characteristics of either the terminal line or the transmission line. It may be obtained from the afore-mentioned characterization that such standards, of different line impedances for example, have to be carefully matched by an implemented hybrid circuit. It is believed that this object at least presently cannot be reached by a singly fully integrated active hybrid circuit. A design of different hybrid circuits for each application on the other hand is also not acceptable in view of design and manufacturing costs.

It is, therefore, a general object of the present invention to provide an improved two- to four-wire hybrid circuit of a telecommunication system with high cross-talk attenuation.

Another object of the present invention is to provide a hybrid circuit designed for moderate adjustments to different impedances, especially terminal line impedances with low cost and minimal impact on either equipment on the side of the terminal line or the design of the transmission medium.

SUMMARY OF THE INVENTION

In the present invention a two- to four-wire hybrid circuit of a telecommunication system for coupling a bidirectional terminal line to a transmission medium constitutes a line coupling circuit having a pair of terminal connectors connected to the terminal line, and a first and a second transmission connnector. The hybrid circuit is provided with first amplifying means having a first and a second output of low impedance delivering output signals in phase opposition and a pair of inputs coupled to a receiving branch of the transmission medium. The first output of the first amplifying means is connected to the first transmission connector of the line coupling circuit. A first impedance is inserted between the second output of the first amplifying means and the second transmission connector of the line coupling circuit. The value of this impedance equals the value of a coupled impedance of the terminal line which coupled value is effective at both transmission connectors. Second amplifying means having a first and a second input of high impedance are connected to the transmitting branch of transmission medium. The first input of the second amplifying means is coupled to the second transmission connector. For establishing a high cross-talk attenuation, a series connection of an attenuator and a second impedance connected via a connector tap couples the first output to the second output of the first amplifying means, whereas the connector tap is connected to the second input of the second amplifying means. For balancing the bridging network consisting of the coupled terminal line impedance, the first impedance, the second impedance and the attenuator, the values of the series connection are chosen such that the resistance value of the attenuator is substantially higher than the value of the actual resistance component of the first impedance and the ratio of the coupled line impedance to the first impedance equals the ratio of the attenuator resistance to the second impedance.

This hybrid circuit structure makes use of the specific characteristics of amplifying means usually associated to the transmission medium in an advantageous manner. These amplifying means usually fulfill the interface requirements of high input impedance in transmitting direction and low output impedance in receiving direction. The interface requirements of the hybrid circuit of the present invention, therefore, can be fulfilled without design changes of present transmission media, so that the use of the present invention does not require any changes of known transmission medium design.

Furthermore, the first and second impedances are designed simply as plug-in units. Different interface requirements according to various national standards can be easily met just by replacing one pair of impedances by another appropriately designed pair. Since these impedances according to another preferred embodiment are composed of RC circuits, such replacement can be had without high cost for manufacturing and supply. Whereas known hybrid circuits are distinctively designed for operating according to one specific set of system standards, it is the main advantage of the present invention that the hybrid circuit being one structural unit can be easily adjusted to different national standards.

BRIEF DESCRIPTION OF THE DRAWINGS

The above-mentioned and other features and objects of this invention and the manner of obtaining them will become more apparent, and the invention itself will be best understood by reference to the following description of a preferred embodiment of the invention, taken in conjunction with the accompanying drawings, wherein.

DETAILED DESCRIPTION OF THE PREFERRED EMBODIMENT

Figure 1:
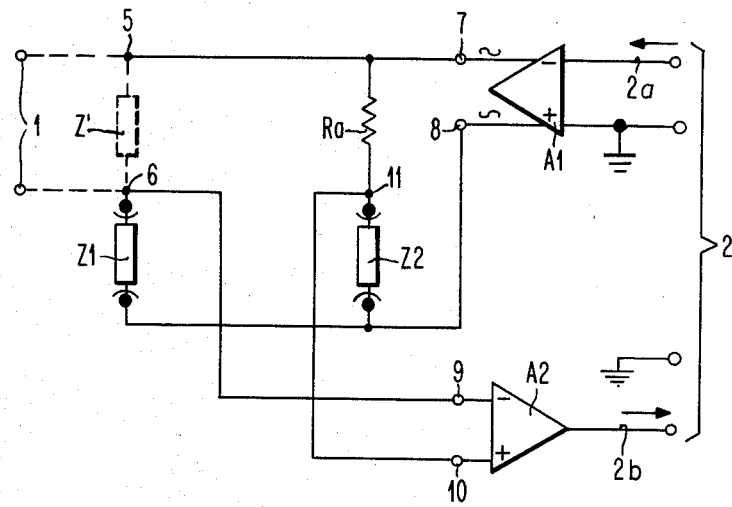
FIG. 1 is an equivalent circuit diagram showing the structure of the hybrid circuit according to the present invention.

The circuit arrangement shown in FIG. 1 represents in form of an equivalent circuit diagram a hybrid circuit for coupling two-wire terminal line 1 to a 4-wire transmission medium, hereinafter designated as transmission line 2. The terminal line 1, for example a subscriber extension line of a telecommunication system is schematically represented by a line impedance $Z'$ shown in broken lines whereby indicating that this line impedance itself forms no part of the hybrid circuit. This element of the equivalent circuit diagram, however also represents the characteristics of a coupling circuit which is coupled between the terminal line 1 and branches 2a, 2b of the transmission line. The line impedance of the terminal line 1 may be of a value Z. The coupled impedance $Z'$ is to be understood as that impedance which is to be measured at transmission connectors 5 and 6 to the 4-wire side of the coupling circuit whereby this coupled impedance $Z'$ depends upon the impedance of the terminal line Z modified by the response characteristics of the coupling circuit.

The transmission line 2 is composed of two branches, a receiving branch 2a and a transmitting branch 2b. Respective arrows indicate the signal transmission direction. The receiving branch 2a of the transmission line interfaces the hybrid circuit by means of first amplifying means, hereinafter designated as receiver amplifier A1 having inputs connected to the receiving branch 2a.

The receiver amplifier has two outputs 7 and 8 operating in phase opposition as indicated by respective sine symbols. It is essential to know that the output impedance at these first and second outputs 7, 8 of the receiver amplifier A1 shall be low to avoid any distorting influence on the networks of the hybrid circuit.

The first output 7 of the receiver amplifier A1 is directly connected to the first transmission connector 5 of the coupling circuit which is represented by the coupled line impedance $Z'$. The second output 8 of the receiver amplifier A1 is coupled to the second transmission connector 6 via an impedance, hereinafter designated as first hybrid impedance Z1. Between the two outputs 7, 8 of the receiver amplifier A1, there is arranged a series connection of an attenuator circuit Ra and another impedance, hereinafter designated as second hybrid impedance Z2, both elements are connected via a connector tap 11.

The hybrid circuit is provided with a second amplifying means, hereinafter designated as transmitter amplifier A2, which is connected by an output to the transmitting branch 2b of the transmission line 2. The transmitter amplifier A2 has two inputs 9 and 10 of high impedance minimizing an influence on the hybrid circuit network. One of these inputs, hereinafter referred to as first input 9, is directly connected to the second transmission connector 6, the other input, hereinafter referred to as second input 10, is connected to the connector tap 11.

The main purpose of the described network is to transmit both analog signals coming in along the receiving branch 2a of the transmission line 2 and supplied to the terminal line 1, and analog signals transmitted from the terminal line 1 to the transmission branch 2b with a small trans-hybrid loss in each direction and with a high cross-talk attenuation from the receiving branch 2a to the transmitting branch 2b. Besides the series connection consisting of the attenuator Ra and the second hybrid impedance Z2 there is arranged in parallel a second series connection consisting of the coupled line impedance $Z'$ and the first hybrid impedance Z1. Both series connections constitute a balancing network performing these requirements. In view of high cross-talk attenuation, the ratio of the impedances of both series connections has to be considered. The first hybrid impedance Z1 is designed such that its value matches the value of the coupled line impedance $Z'$. The attenuator Ra has a high resistance with regard to these two impedances and determines mainly the entire impedance of the respective series connection. The ratio of the impedances of the coupled line impedance Z' and the first hybrid impedance Z1 in comparison with the resistance value of the attenuator Ra determines the trans-hybrid characteristic of the hybrid circuit.

The voltage difference between the voltage levels being present at the second transmission connector 6 and the connector tap 11 corresponds to the differential input signal of the transmitter amplifier A2. The second hybrid impedance Z2 is designed such that its value balances the influence of the coupled line impedance Z' and the first hybrid impedance Z1, on the one hand, and the gain of the transmitter amplifier, on the other hand. In other words, the second hybrid impedance Z2 is designed such that the ratio of the coupled line impedance Z' to the first impedance Z1 equals the ratio of the attenuator R to the second impedance Z2.

This structure of a hybrid circuit described above meets all requirements of a low trans-hybrid loss between the terminal line 1 and the transmitter line 2 and a high cross-talk attenuation between the receiving branch 2a and the transmitting branch 2b of the transmission line. As to be obtained from the antecedent description, one of the main advantages of this structure is that the balancing network can easily be adjusted to different standards for the terminal line 1 without impact on the general characteristics of the hybrid circuit. The same structure may be used without redesign for different terminal lines having different line impedance characteristics just by replacing the first and the second hybrid impedances Z1, Z2. An actual design of such a hybrid circuit, therefore, will be provided with first and second hybrid impedances constituting plug-in units so that by one type of hybrid circuit different types of national standards for a terminal line can be met just by replacing both the first and the second hybrid impedances.

Figure 2:
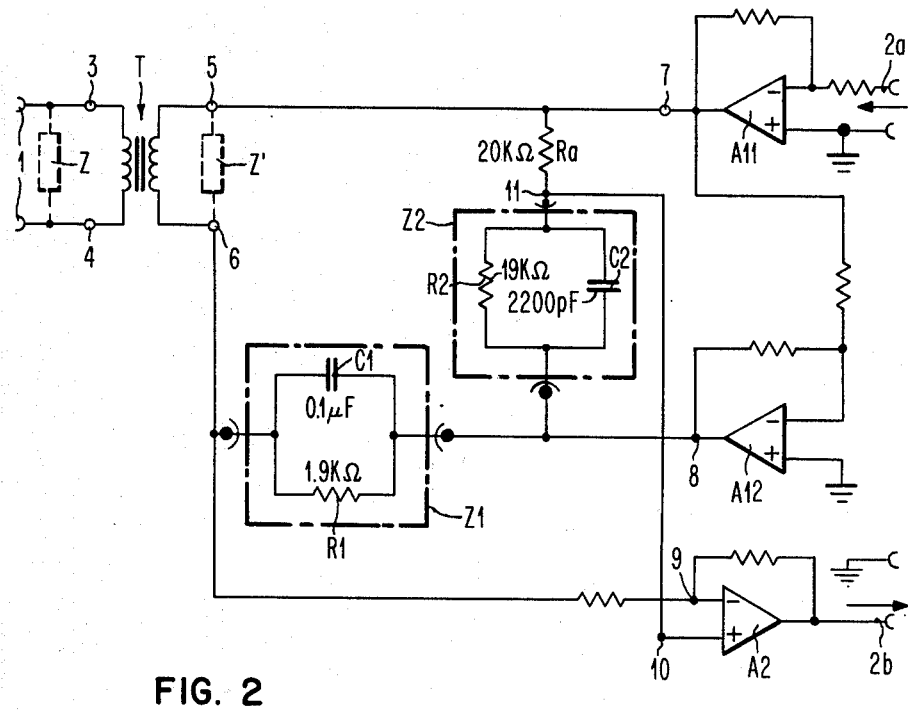
FIG. 2 is a circuit diagram showing one embodiment of the hybrid circuit in a more specific layout according to national standards.

An actual design of such a hybrid circuit is shown in FIG. 2. This hybrid circuit is arranged between a terminal line 1 having a line impedance constituting a resistance of 1100 ohm in parallel to a capacitance of 80 nF according to the requirements of the German Bundespost, for comparison the equivalent terminal line impedance at a common U.S. standard would be a resistance of 600 ohm in series to a capacitance of 2.15 µF.

The terminal line 1 is connected to terminal line connectors 2, 3 of the coupling circuit, in this example composed of a transformer T with a turn-ratio of 1 to 1. The transformer, in turn, has the first and the second transmission connectors 5 and 6 at the four-wire side. The receiver amplifier connected at its input side to the receiving branch 2a of the transmission line 2 is composed of two amplifying stages A11 and A12. The two outputs of both amplifying stages correspond to the first output 7 and the second output 8 of the receiver amplifier A1 shown in the schematic diagram of FIG. 1. The output of the first amplifying stage A11 is coupled to one input of the second amplifying stage A12. Each of the amplifying stages of the receiver amplifier has one input connected to ground and a resistor input network for adjusting the gain of the respective amplifying stage. This circuit arrangement of the two amplifying stages A11 and A12 forms a common push-pull amplifier arrangement with two outputs operating in phase opposition.

The first output 7 of the receiver amplifier is directly connected to one coil of the transformer by the first transmission connector 5. The first output 7 and the second output 8 of the receiver amplifier are interconnected by the series connection of the attenuator Ra and the second hybrid impedance Z2. The attenuator Ra having a value of 20 k ohm is connected to the second hybrid impedance Z2 via the connector tap 11. The second hybrid impedance Z2 is composed of a resistor R2 of 19 k Ω and a capacitor C2 of 2200 pF both arranged in parallel.

The first hybrid impedance Z1 coupling the second output 8 of the receiver amplifier A11, A12 to the second transmission connector 6 of the transmitter T similarly is composed of a parallel RC circuit. A resistor R1 of 1.9 k Ω and a capacitor C1 of 0.1 µF thus constitute this first line impedance Z1.

The circuit arrangement is completed by the transmitter amplifier A2 similarly equipped with an input load resistor and a feed back resistor network to define a specific gain of the amplifier according to the requirements for the signal level at the output side which is connected to the transmitting branch 2b of the transmission line 2. As indicated in FIG. 2 this transmitter amplifier A2 as well as the two amplifying stages A11 and A12 of the receiver amplifier are composed of differential amplifiers. The negative input, referred to as first input 9, is connected via a load resistor to the second transmission connector 6 whereas the positive input, referred to as second input 10, is connected to the connector tap 11.

It may be obtained from this design embodiment that the actual layout of the hybrid circuit according to the present invention is composed of only a few components mainly constituting the two hybrid impedances Z1 and Z2. The three amplifying stages A11, A12 and A2 usually are part of the circuitry of the transmission line 2. The invention makes use of such a conventional electrical circuit arrangement in a very advantageous manner to obtain interfacing requirements of the balancing network of the hybrid circuit so that this network can be composed of a few components arranged in a simple structure.

There has thus been shown and described a novel two to four wire hybrid circuit which will fulfills the objects and advantages sought therefore. Many changes, modification, variations and other uses and applications of the subject invention will, however, become apparent to those skilled in the art after considering this specification and the accompanying drawings. It may be understood that, above all the transmission line physically could be any transmission medium, it could be composed of fiber optics, a microwave system and others. The use could be for a telephone switching system as well as a conversion arrangement for digital transmission for use with a computer dialog over telephone lines and any other digital data transmission. Furthermore, the coupling circuit may be of any other design besides a transformer and could also be an active network.

All such changes, modifications, variations and other uses and applications which do not depart from the spirit and scope of the invention are deemed to be covered by the invention which is limited only by the claims which follow.

What is claimed is:

1. A two- to four-wire hybrid circuit for coupling a bidirectional terminal line to a transmission medium having separate branches for a receiving and a transmitting direction of analog electrical signals, said circuit comprising:

(a) a line coupling circuit having a pair of terminal connectors connected to said terminal line; and a first and a second transmission connector;

(b) first amplifying means, including an input adapted to receive respective ones of said electrical signals from said receiving branch and a first and a second output of low impedance delivering output signals in phase opposition; said first output being connected to said first transmission connector;

(c) a first impedance designed as plug-in unit and arranged between said second output and said second transmission connector and having a value of the coupled terminal line impedance, effective at said transmission connectors;

(d) second amplifying means having a first and a second input both of high impedance and an output adapted to transmit respective ones of said electrical signals to said transmitting branch; said first input of said second amplifying means being connected to said second transmission connector;

(e) a series circuit including an attenuator and a second impedance designed as plug-in unit, both connected via a connector tap, said series circuit being arranged between said outputs of said first amplifying means, said connector tap being connected to said second input of said second amplifying means wherein the values of said series circuit are chosen such that the resistance value of said attenuator is substantially higher than the value of the actual resistance component of the first impedance and the ratio of said coupled line impedance to said first impedance equals the ratio of the resistance of said attenuator to said second impedance.

2. The two- to four-wire hybrid circuit as recited in claim 1, wherein the coupling circuit comprises a transformer.

3. The two- to four-wire hybrid circuit as recited in claim 2, wherein the transformer comprises a transforming ratio of 1 to 1.

4. The two- to four-wire. hybrid circit as recited in claim 1, wherein the first and second impedances are composed of RC circuits.

5. The two- to four-wire hybrid circuit as recited in claim 1, wherein the first and second amplifying means comprise operational amplifiers.

6. The two- to four-wire hybrid circuit as recited in claim 5, wherein the first amplifying means comprise two operational amplifiers being connected in series to perform a push-pull operation; and each of said operational amplifier connected in series having an output forming a respective one of said first and second output of said first amplifying means.

\* \* \* \* \*